US012771218B2

(12) United States Patent
Guedes-Pinto et al.

(10) Patent No.: US 12,771,218 B2
(45) **Date of Patent: *Oct. 20, 2026**

(54) MODULAR AXIAL FIELD ROTARY ENERGY DEVICE WITH PCB STATOR AND VARIABLE FREQUENCY DRIVE SYSTEM

(71) Applicant: INFINITUM ELECTRIC INC., Austin, TX (US)

(72) Inventors: Paulo Guedes-Pinto, Round Rock, TX (US); Shriram Pushparaj Patil, Richmond, TX (US); John Mitchell Wilson, Cedar Park, TX (US); Randal A. Lee, Austin, TX (US); Zachary Thomas Radkey-Pechacek, Leander, TX (US); Luke Robert Wilkin, Austin, TX (US)

(73) Assignee: INFINITUM ELECTRIC INC., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 19/005,022

(22) Filed: Dec. 30, 2024

(65) Prior Publication Data

US 2025/0132645 A1 Apr. 24, 2025

Related U.S. Application Data

(63) Continuation of application No. 18/421,200, filed on Jan. 24, 2024, now Pat. No. 12,191,720, which is a (Continued)

(51) Int. Cl.

*H02K 5/10* (2006.01)
*H02K 3/26* (2006.01)

(Continued)

(52) U.S. Cl.

CPC ............... *H02K 11/33* (2016.01); *H02K 3/26* (2013.01); *H02K 5/10* (2013.01); *H02K 5/1732* (2013.01);

(Continued)

(58) Field of Classification Search

CPC ........ H02K 11/33; H02K 11/40; H02K 9/223; H02K 3/26; H02K 5/10; H02K 5/1732;

(Continued)

(56) References Cited

U.S. PATENT DOCUMENTS

| | | | |
|---|---|---|---|
| 7,091,679 | B2 | 8/2006 | Schroeder et al. |
| 10,135,310 | B2 | 11/2018 | Schuler et al. |

(Continued)

FOREIGN PATENT DOCUMENTS

| | | | |
|---|---|---|---|
| DE | 102022104152 | A1 | 8/2023 |
| JP | 2017147919 | A | 8/2017 |

OTHER PUBLICATIONS

European Searching Authority, Extended European Search Report for European Application No. EP 24 19 9665, Date of Mailing Mar. 7, 2025, 5 pages.

(Continued)

*Primary Examiner* — Terrance L Kenerly
(74) *Attorney, Agent, or Firm* — Dickinson Wright PLLC

(57) ABSTRACT

A system can include an axial field rotary energy device with an axis of rotation and a rotor coaxial with the axis and having a shaft, bearings, rotor disks that are coaxial and permanent magnets on each rotor disk. A printed circuit board (PCB) stator is located between the rotor disks to define an air gap on each side of the PCB stator. An enclosure has two enclosure sections with an inspection port. Bearing caps and bearings are mounted to the rotor. A variable frequency drive (VFD) assembly is coupled to the axial field rotary energy device. The VFD has a flexible (Continued)

conduit that extends between the VFD housing and the axial field rotary energy device. The flexible conduit can adapt to different sizes of axial field rotary energy devices.

20 Claims, 11 Drawing Sheets

Related U.S. Application Data continuation of application No. 18/373,578, filed on Sep. 27, 2023, now Pat. No. 11,936,253.

(51) Int. Cl.

| | |
|---|---|
| ***H02K 5/173*** | (2006.01) |
| ***H02K 7/08*** | (2006.01) |
| ***H02K 9/06*** | (2006.01) |
| ***H02K 9/22*** | (2006.01) |
| ***H02K 11/33*** | (2016.01) |
| ***H02K 11/40*** | (2016.01) |
| ***H02K 21/24*** | (2006.01) |

(52) U.S. Cl.
CPC ............... *H02K 7/083* (2013.01); *H02K 9/06* (2013.01); *H02K 9/223* (2021.01); *H02K 11/40* (2016.01); *H02K 21/24* (2013.01); *H02K 2203/03* (2013.01); *H02K 2213/12* (2013.01)

(58) Field of Classification Search
CPC .......... H02K 7/083; H02K 9/06; H02K 21/24; H02K 2203/03; H02K 2213/12
USPC ........................................................ 310/68 R
See application file for complete search history.

(56) References Cited

U.S. PATENT DOCUMENTS

| | | | | |
|---|---|---|---|---|
| 10,141,803 | B2 | 11/2018 | Schuler et al. | |
| 10,141,804 | B2 | 11/2018 | Schuler et al. | |
| 10,186,922 | B2 | 1/2019 | Schuler et al. | |
| 10,340,760 | B2 | 7/2019 | Schuler et al. | |
| 11,183,896 | B2 | 11/2021 | Guedes-Pinto et al. | |
| 11,509,179 | B2 | 11/2022 | Lee et al. | |
| 11,936,253 | B1 | 3/2024 | Guedes-Pinto et al. | |
| 12,191,720 | B1 * | 1/2025 | Guedes-Pinto | H02K 21/24 |
| 2005/0127675 | A1 | 6/2005 | Kirkpatrick et al. | |
| 2021/0006128 | A1 | 1/2021 | Eason et al. | |
| 2021/0135526 | A1 | 5/2021 | Guedes-Pinto et al. | |
| 2021/0218304 | A1 | 7/2021 | Schuler et al. | |
| 2022/0224174 | A1 | 7/2022 | Le et al. | |
| 2023/0019894 | A1 | 1/2023 | Lee et al. | |
| 2023/0044158 | A1 | 2/2023 | Lee et al. | |

OTHER PUBLICATIONS

European Searching Authority, European Search Report for European Application No. EP 24 19 9669, Date of Mailing Feb. 19, 2025, 9 pages.

* cited by examiner

NON-DRIVE END

MODULAR AXIAL FIELD ROTARY ENERGY DEVICE WITH PCB STATOR AND VARIABLE FREQUENCY DRIVE SYSTEM

CROSS-REFERENCE TO RELATED APPLICATIONS

This is a continuation application that claims priority to and the benefit of U.S. Ser. No. 18/421,200 filed Jan. 24, 2024, which is a continuation application that claims priority to and the benefit of U.S. Ser. No. 18/373,578 filed Sep. 27, 2023, now U.S. Pat. No. 11,936,253, each of which is incorporated herein by reference in its entirety.

BACKGROUND OF THE INVENTION

Field of the Invention

This disclosure relates in general to electric motors and, in particular, to a system, method and apparatus for an electronic commutated motor (ECM) comprising an axial field rotary energy device with a printed circuit board (PCB) stator and an integrated variable frequency drive (VFD).

Description of the Prior Art

Axial field rotary energy devices such as those described in U.S. Pat. Nos. 10,141,803, 10,135,310, 10,340,760, 10,141,804 and 10,186,922 (which are incorporated herein by reference in their entirety) use a variable frequency drive (VFD) to operate when connected to a 60 or 50 Hz alternating current (AC) source. U.S. Pat. Nos. 11,183,896 and 11,509,179 (also incorporated herein by reference in their entirety) propose systems where axial field rotary energy devices are coupled to VFDs and can operate connected to 60 or 50 Hz alternating current (AC) sources. FIG. 1 depicts examples of such systems with power ratings ranging from 5 to 15 hp. It can be seen in those examples that as the size of the axial field rotary energy device increases as a function of the device's power, the size of the VFD enclosure increases at the same rate. For example, diameter 1 (D1) is larger than D2, D2 is larger than D3, and D3 is larger than D4 in FIG. 1. Thus, each machine can require different parts and tooling to build those systems. Another undesirable effect of the increase in size of the VFD enclosure is the added overall weight of the axial field rotary energy device and VFD system. In order to simplify and streamline manufacturing processes and reduce volume and weight of the axial field rotary energy device and VFD system, it is desirable to have a VFD package that occupies substantially the same volume independently of its power rating and can be coupled to enclosures of axial field rotary energy devices independently of their rating.

SUMMARY

Embodiments of systems comprising an axial field rotary energy device and respective variable frequency drive (VFD) are disclosed. Hereinafter, these embodiments can be referred to as a VFD integrated system, a motor-VFD assembly, etc. For example, the VFD integrated system can include an axial field rotary energy device having a printed circuit board (PCB) stator coaxial with rotor disks having respective magnets. The PCB stator can be located axially between the rotor disks that are coupled to a common shaft that can rotate about an axis of rotation. The rotor disks and PCB stator can be positioned inside a clam shell enclosure having features that allow for inspecting and adjusting the mechanical air gaps between the PCB stator and respective rotor disks without disassembling the axial field rotary energy device. The VFD can be located in a separate enclosure with mounting features that enable attaching the VFD to enclosures of different sizes of axial field rotary energy devices. The VFD enclosure can have features that provide water and dust ingression protection meeting IP54 or IP55 degree of protection as per IEC60034-5, for example.

The VFD enclosure can provide selective access to parts of the VFD electronic circuit facilitating connection of power or control cables to the VFD while preventing users from touching electrically charged components, such as capacitors, for example. The VFD enclosure also can have features that provide visual information about the status of the VFD without having to open the enclosure or remove covers. Furthermore, the VFD enclosure can have features to capture and dissipate the heat generated by components such as MOSFETs, rectifier bridges and inductors, for example.

BRIEF DESCRIPTION OF THE DRAWINGS

So that the manner in which the features and advantages of the embodiments are attained and can be understood in more detail, a more particular description can be had by reference to the embodiments that are illustrated in the appended drawings. However, the drawings illustrate only some embodiments and are not to be considered limiting in scope since there can be other equally effective embodiments.

It shall be noted that some of the details and/or features shown in the drawings herein may not be drawn to scale for clarity purposes and some elements.

DETAILED DESCRIPTION

This disclosure includes embodiments of systems comprising a first enclosure containing an axial field rotary energy device having one or more rotors with magnets and one or more printed circuit board (PCB) stators, and a second enclosure containing a variable frequency drive (VFD), input and output (I/O) interfaces, inductors, and other components. However, it should be understood that the axial field rotary energy device in these VFD integrated systems can operate as a motor or as a generator. While the axial field rotary energy device enclosure can increase or decrease in size as a function of its power or torque, the VFD enclosure in the embodiments described herein can have the same size or substantially the same size regardless of the power rating of the respective axial field rotary energy device.

Figure 1:
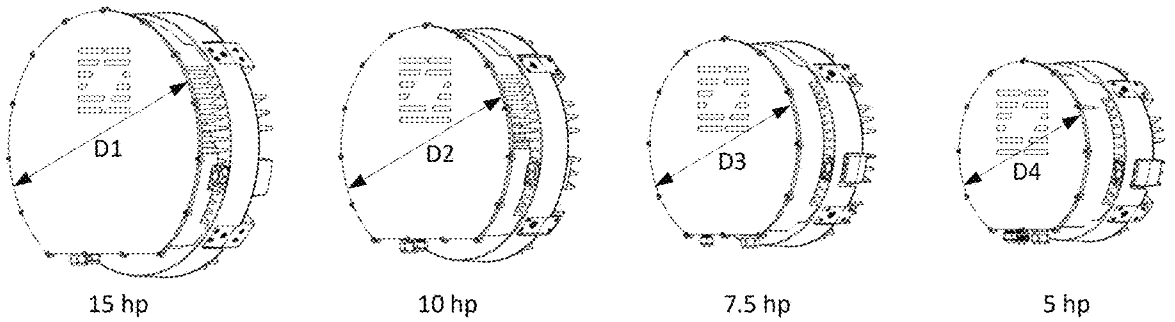
FIG. 1 PRIOR ART
FIG. 1 is an isometric view of conventional axial field rotary energy devices and VFD systems.
Figure 2:
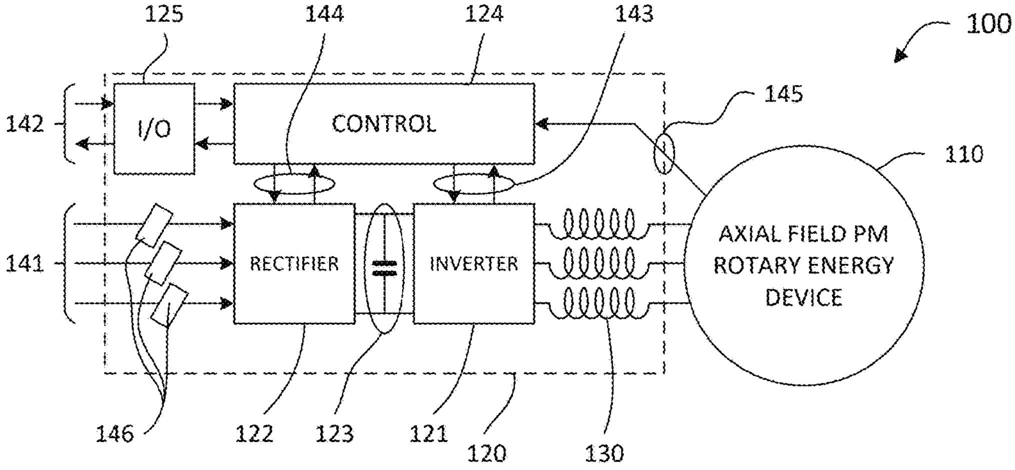
FIG. 2 is a general schematic view of an embodiment of a VFD integrated system.

FIG. 2 shows a general schematic view of an embodiment of a VFD integrated system 100 comprising an axial field rotary energy device 110 and a VFD assembly 120. Hereinafter, a "VFD 120" refers to the electronics that comprise a functional VFD and its enclosure. In this embodiment, an axial field rotary energy device 110 can be coupled to an inverter module 121 of a VFD 120 through line inductors 130. In other versions, the line inductors 130 can be absent, such that the axial field rotary energy device 110 can be connected directly to the inverter module 121 of the VFD 120. While the example shown in FIG. 2 depicts a 3-phase motor connected to a 3-phase inverter, other phase arrangements are possible, such as 6, 9 or 12-phase devices, just to mention few options.

In FIG. 2, the VFD 120 can comprise a rectifier module 122, a DC bus module 123, an inverter module 121, and a control module 124. The rectifier module 122 can be, as an example, a full wave rectifier having passive devices, such as diodes, or active switching devices (e.g., IGBTs, MOSFETs, etc.) to convert the incoming alternating current (AC) from the rectifier input 141 to direct current (DC). In some embodiments, the rectifier input can have ferromagnetic cores 146 in each phase to filter common mode currents. The DC bus 123 can include a bank of capacitors sized to provide stable voltage to the inverter module 121. The inverter module 121 can have, as an example, a 6-pulse 3-phase bridge, which can use active switching devices, such as IGBTs or MOSFETS, controlled by a pulse width modulation (PWM) scheme to convert DC to AC at the frequency required by the axial field rotary energy device 110. However, other inverter topologies can be used, such as 3-level neutral point clamped (NPC) inverter. Although the input to the VFD 120 is typically AC at 60 or 50 Hz, the output frequency of the VFD 120 can range from, for example, a frequency near zero Hz, to a frequency in the hundreds or even thousands of Hz. In some embodiments where the PWM frequencies are high (e.g., above 50 kHz), the inverter module 121 can comprise wide band gap (WBG) devices such as silicon carbide or gallium nitride MOSFETs.

The VFD integrated system 100 depicted in FIG. 2 can include a control module 124 that provides and receives signals to and from the various modules of the VFD 120. The control module can be coupled to an I/O and communication module 125 (hereinafter referred to as I/O module) configured to receive control signals from an external source through input ports 142, such as a digital signal, to turn the VFD on or off, or an analog voltage signal that can provide a speed reference to the system. These signals can control the output frequency of the VFD 120, and therefore the speed of the axial field rotary energy device 110. They also can control the current and voltage supplied by the VFD 120 to the axial field rotary energy device 110 to achieve desired torque characteristics, such as operating at a constant torque condition over a certain speed range. FIG. 2 depicts input and output connections 143 and 144 between the control module 124 and the inverter module 121 and rectifier 122, respectively. In some embodiments, some of the input or output connections can be absent. In some embodiments, the control module 124 also can be connected to sensors in the axial field rotary energy device 110 via a separate set of input lines 145. The sensors can include, for example, resistance temperature detectors (RTD), thermocouples, vibration sensors, encoders, and/or other sensors.

In some embodiments of the VFD integrated system 100, the control module 124 in conjunction with the I/O module 125 can be configured to receive and transmit information to a supervisory control and data acquisition system (SCADA) or other control system. The I/O module 125 can have a communication interface that can be configured to operate various communication protocols including, but are not limited to, Modbus RTU, Modbus TCP/IP, Ethernet, EtherCAT, EtherNet/IP, PROFINET, POWERLINK, SERCOS III, CC-Link IE, BacNET, RS485, LTE-M, and Bluetooth. The I/O module also can accept analog inputs, such as a 0-10 V or a 4-20 mA.

Although FIG. 2 depicts a VFD integrated system 100 with the axial field rotary energy device 110 operating as a motor, other embodiments of the VFD integrated systems can be operated as generator systems where the axial field rotary energy device 110 can operate as an alternator, and the VFD 120 can operate as an AC/AC power converter providing the integration to an external grid or powering an islanded load. In these cases, the inverter module 121 can operate as an active rectifier of the AC/AC power converter and the rectifier 122 can have active switching devices such as IGBTs or MOSFETs and operate as an inverter. The control module 124 can provide the signals to control the active rectifier by means of the communication ports 143 and signals to control the inverter through ports 144, for example.

Figure 3:
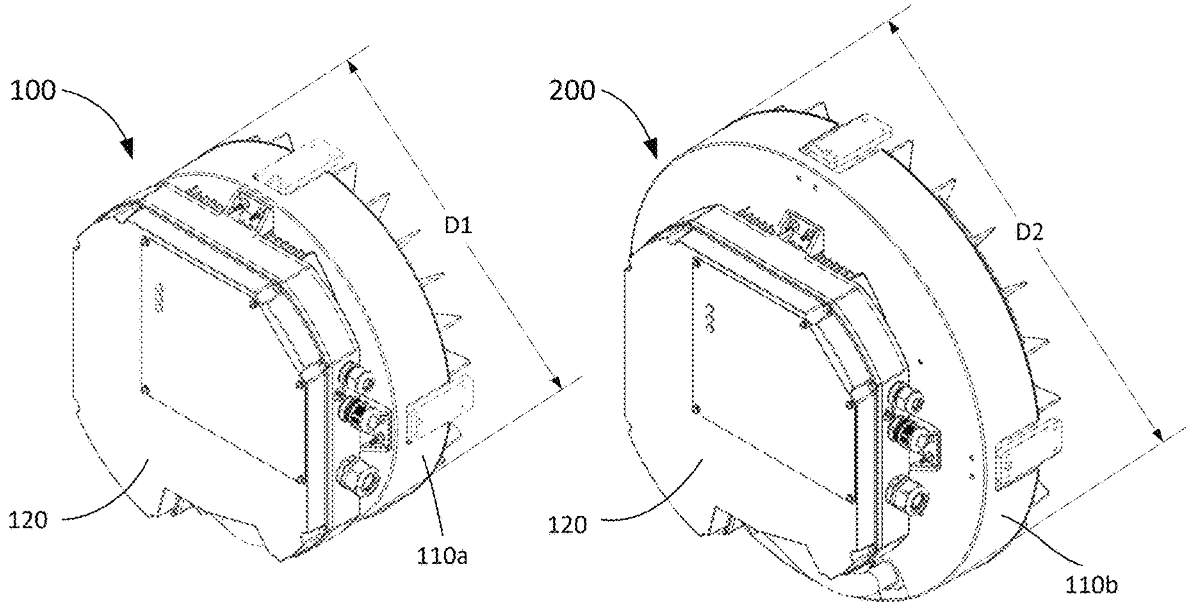
FIG. 3 is an isometric view of embodiments of axial field rotary energy devices and VFD systems having a modular VFD enclosure.

Embodiments of the VFD 120 can have different power ratings but can have the same size or substantially the same size. FIG. 3 shows examples of VFD integrated systems 100 and 200, where the respective axial field rotary energy devices 110*a*, 110*b* can have different power ratings and outer diameters. For example, the VFD integrated system 100 can have a rating of 7.5 hp and a diameter D1 of approximately 380 mm, and the VFD integrated system 200 can have a rating of 15 hp and a diameter D2 of approximately 520 mm. However, their respective VFDs 120 can occupy the same volume and have the same enclosure.

Figure 4A:
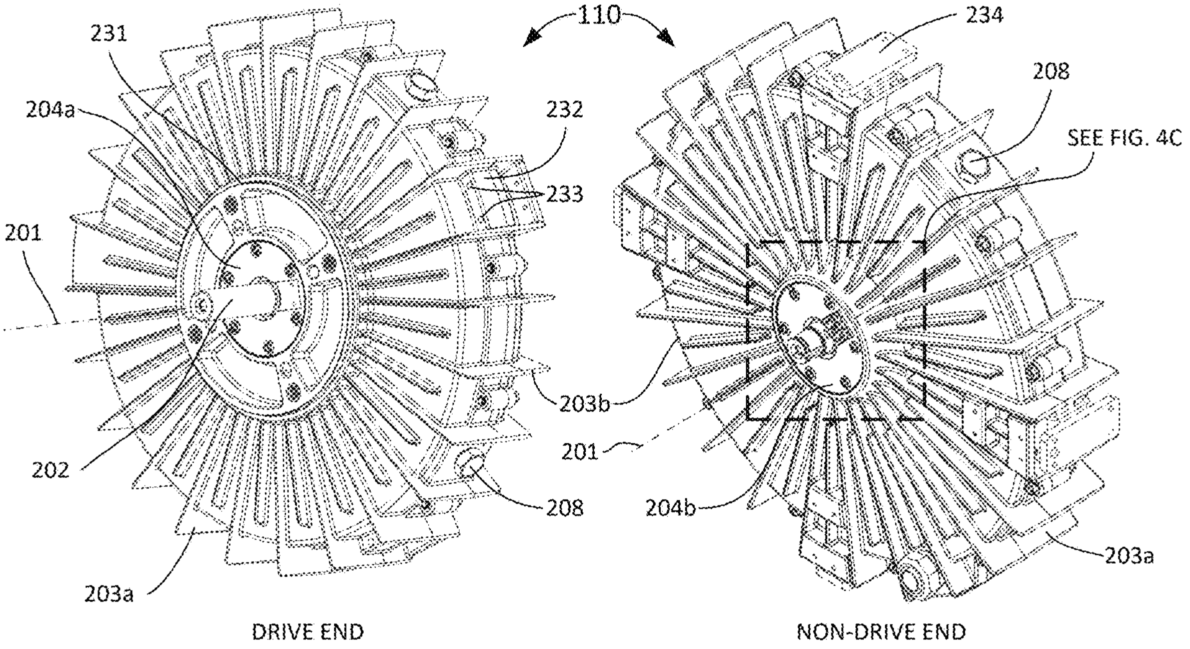
FIG. 4A is an isometric view from different angles of an embodiment of an axial field energy device without the VFD enclosure.
Figure 4B:
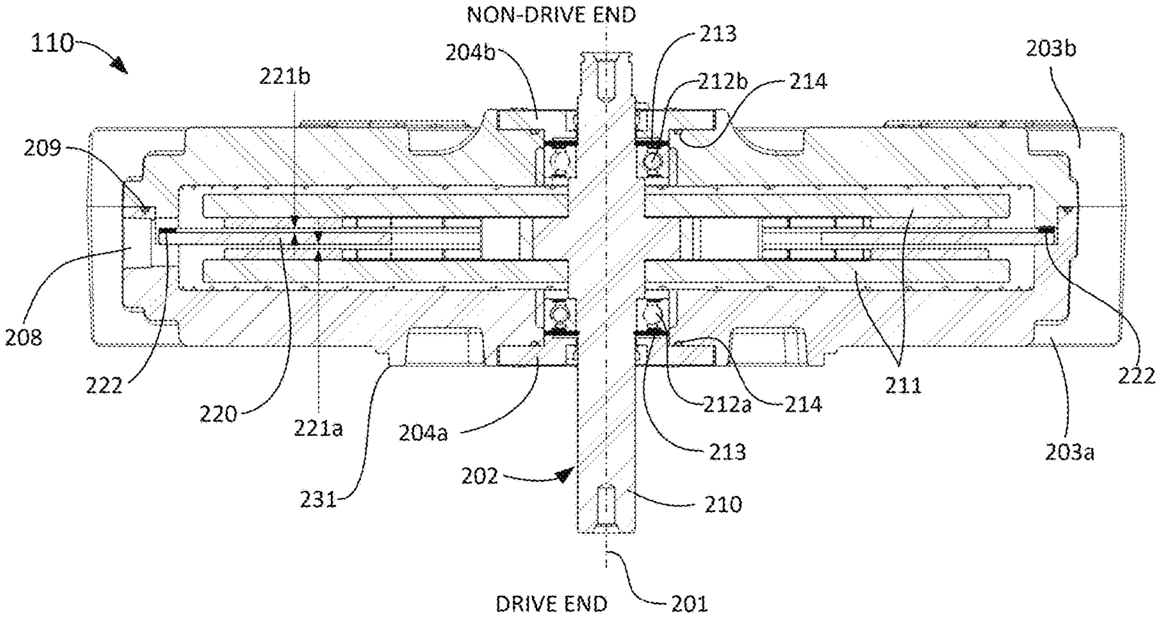
FIG. 4B is a sectional side view of the device shown in FIG. 4A.

FIGS. 4A to 4D show an embodiment of an axial field rotary energy device 110 that can be part of a VFD integrated system. FIG. 4A shows a view from both the drive end side and the non-drive end side of the axial field rotary energy device 110. The axial field rotary energy device 110 can comprise a rotor 202 that can rotate about an axis of rotation 201. The rotor 202 can comprise rotor disks 211 coupled to a shaft 210 that can rotate about the axis of rotation 201 (FIG. 4B).

The axial field rotary energy device 110 can further comprise an enclosure formed by two clam shell enclosure sections 203*a* and 203*b*. The enclosure section 203*a* is on the drive end of the axial field rotary energy device 110, and the enclosure section 203*b* is on the non-drive end. When the two enclosure sections 203*a* and 203*b* are coupled together, they can secure the PCB stator 220 (FIG. 4B) which is coaxial with the enclosure sections 203*a*, 203*b*. A shim 222 can be positioned on at least one face of the PCB stator 220 and the corresponding enclosure section (203*b*, for example) to secure the PCB stator 220 axially relative to the enclosure sections 203*a* and 203*b*. The shim 222 can be substantially ring-shaped and be made of copper, aluminum, or copper foam, for example, or any other metal alloy or material that is a good thermal conductor so it also can help transfer heat from the PCB stator 220 to the enclosure sections 203*a* and 203*b*. The shim 222 can be available in different thicknesses (0.25, 0.50 and 0.75 mm, for example) to accommodate for assembly tolerances. In some embodiments, the shim 222 can be segmented, so a plurality of segments can form a ring.

The two enclosure sections 203*a* and 203*b* are coaxially aligned with each other and are coaxial with the axis of rotation 201 and the rotor 202. The rotor 202 can be rotatably mounted to the respective enclosure sections 203*a* and 203*b*, such as with bearings 212*a* and 212*b* respectively. While FIG. 4B shows an embodiment of the axial field rotary energy device 110 with same size bearings 212*a*, 212*b*, other embodiments can have bearings with different sizes and/or configurations. For example, bearing 212*a* can be a roller bearing and bearing 212*b* can be a ball bearing.

The enclosure sections 203*a* and 203*b* can be configured to receive bearing caps 204*a* and 204*b* respectively. Each enclosure section 203*a*, 203*b* can have a channel 214 configured to receive a gasket, or O-ring, for example, that provides a seal between each of enclosure sections 203*a*, 203*b* and the respective bearing caps 204*a*, 204*b* to prevent the ingression of contaminants into the respective bearings 212*a*, 212*b*. In some embodiments, one or more annular shims 213 (FIG. 4B) can be positioned between the bearing caps 204*a* and 204*b* and the respective bearings 212*a* and 212*b* to provide bearing pre-load and to position the rotor 202 axially in relation to the enclosure sections 203*a* and 203*b*. This feature is advantageous to position the rotor disks 211 axially relative to the PCB stator 220 and establish the air gaps 221*a* and 221*b* between the PCB stator 220 and the respective rotor disks 211. For operation of the axial field rotary energy device 110, the air gaps 221*a* and 221*b* can have substantially the same width. The air gaps 221*a*, 221*b* can be adjusted by removing the annular shim 213 from the space between one bearing cap 204*a* or 204*b* and its respective bearing 212*a* or 212*b*, and adding an annular shim 213 to the space between the opposing bearing cap 204*a*, or 204*b* and its respective bearing 212*a*, or 212*b*. For example, by removing the annular shim 213 from the space between the bearing cap 204*a* and the bearing 212*a* and adding an annular shim 213 to the space between the bearing cap 204*b* and the bearing 212*b*, the rotor 202 can be axially shifted towards the drive end of the axial field rotary energy device 110 to narrow the air gap 221*a* and widen the air gap 221*b*. To enable this feature, there can be multiple annular shims 213 in each space between the bearing caps 204*a*, or 204*b* and the respective bearings 212*a*, or 212*b*. In addition, the annular shims 213 can have different thicknesses to provide a wide range of adjustments. Another advantage of this embodiment is that the bearing caps 204*a* and 204*b*, annular shims 213 and bearings 212*a* and 212*b* can form an assembly where the rotor 202 does not move axially during operation independently of the orientation of the axis of rotation 201 (horizontal, vertical, or inclined). Furthermore, it allows the axial field rotary energy device 110 to be mounted vertically with the drive end pointing up or down.

Further in FIG. 4B, one of the enclosure sections 203*a*, for example, can have a channel 209 configured to receive a gasket, or O-ring, for example, that provides a seal between the two enclosure sections 203*a*, and 203*b* to prevent the ingression of water or dust into the axial field rotary energy device 110. This, along with seals in channels 214, can enable the axial field rotary energy device 110 to achieve a degree of protection IP54, IP55 or higher, as per IEC60034-5, for example.

Figure 4C:
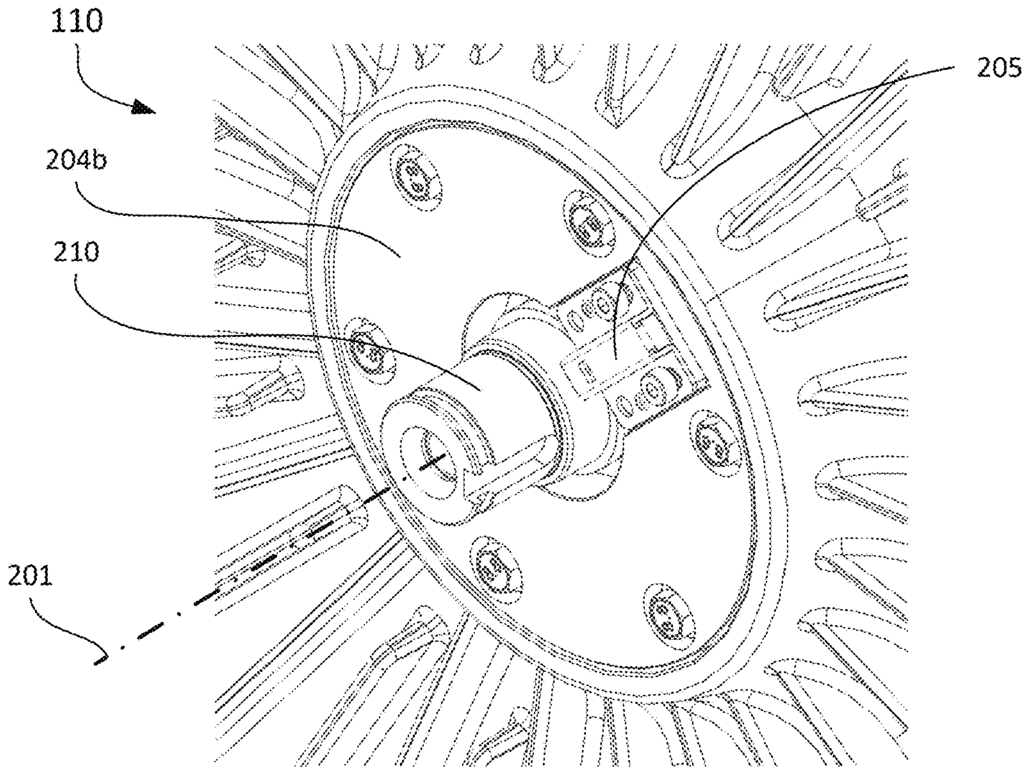
FIG. 4C is an isometric view of an enlarged portion of the device shown in FIG. 4A.

The bearing caps 204*a* and 204*b* (FIG. 4A) can have a slot configured to receive a grounding brush 205 (FIG. 4C) that can be mounted to gently touch the shaft 210 (FIG. 4B) of the rotor 202. This feature is beneficial as it can prevent parasitic currents from circulating through the bearings 212*a*, and 212*b* which can damage and shorten their life. FIGS. 4A to 4C show an embodiment of the axial field rotary energy device 110 that has a grounding brush 205 mounted on the bearing cap 204*b* on the non-drive end. Some embodiments of the axial field rotary energy device 110 can have the grounding brush 205 mounted on the bearing cap 204*a* on the drive end, while other embodiments of the axial field rotary energy device 110 can have grounding brushes 205 mounted on both bearing caps 204*a* and 204*b*.

The enclosure section 203*a* on the drive end can have a mounting flange 231 (FIG. 4A) to facilitate assembling the axial field rotary energy device 110 to a driven equipment or prime mover, depending on whether the axial field rotary energy device 110 is a motor or a generator. The axial field rotary energy device 110 also can be configured with flanges 232 (FIG. 4A) at certain circumferential locations (at every 90 degrees, for example). Each flange can have mounting holes 233 that are parallel to the axis of rotation 201. The flanges 232 can receive removable mounting brackets 234 that can be fastened to the flanges 232 with bolts coupled to the mounting holes 233. These features enable the axial field rotary energy device 110 to be mounted to a frame, for example.

Figure 4D:
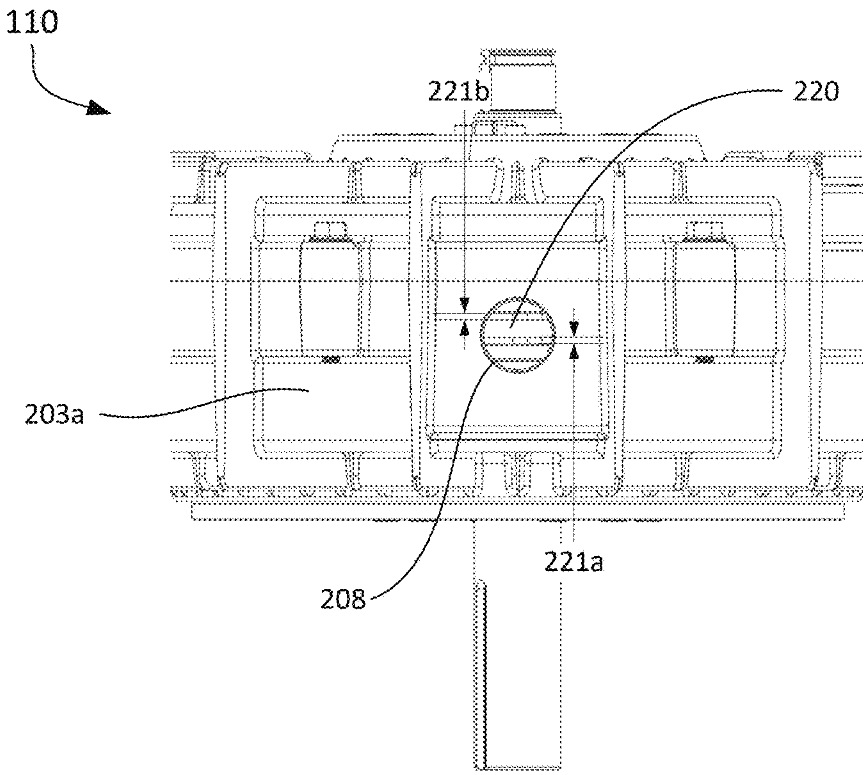
FIG. 4D is a side view of an enlarged portion of the device shown in FIG. 4A.

One of the enclosure sections 203*a*, for example, of the axial field rotary energy device 110, can have one or more radially-oriented inspection ports 208 (FIGS. 4A and 4D) on the sides thereof. The inspection ports 208 can be aligned with the stator 220 and the air gaps 221*a* and 221*b* to provide a direct line of sight to the air gaps 221*a* and 221*b* (FIG. 4D). This feature is advantageous because it can provide a view of the interior of the axial field rotary energy device 110 during assembly. The inspections ports 208 also can provide physical access to the interior for a direct measurement of the air gaps after the axial field rotary energy device 110 is assembled. While not being used, the inspection ports 208 can be sealed with a removable threaded plug that provides protection against ingression of water or dust into the axial field rotary energy device 110. As one example, the embodiment shown in FIG. 4A can have four inspection ports 208 that are uniformly spaced around the circumference of the enclosure section 203*a*. Other axial field rotary energy devices can have a different number of inspection ports and the spacing between the ports can be non-uniform.

Figure 5A:
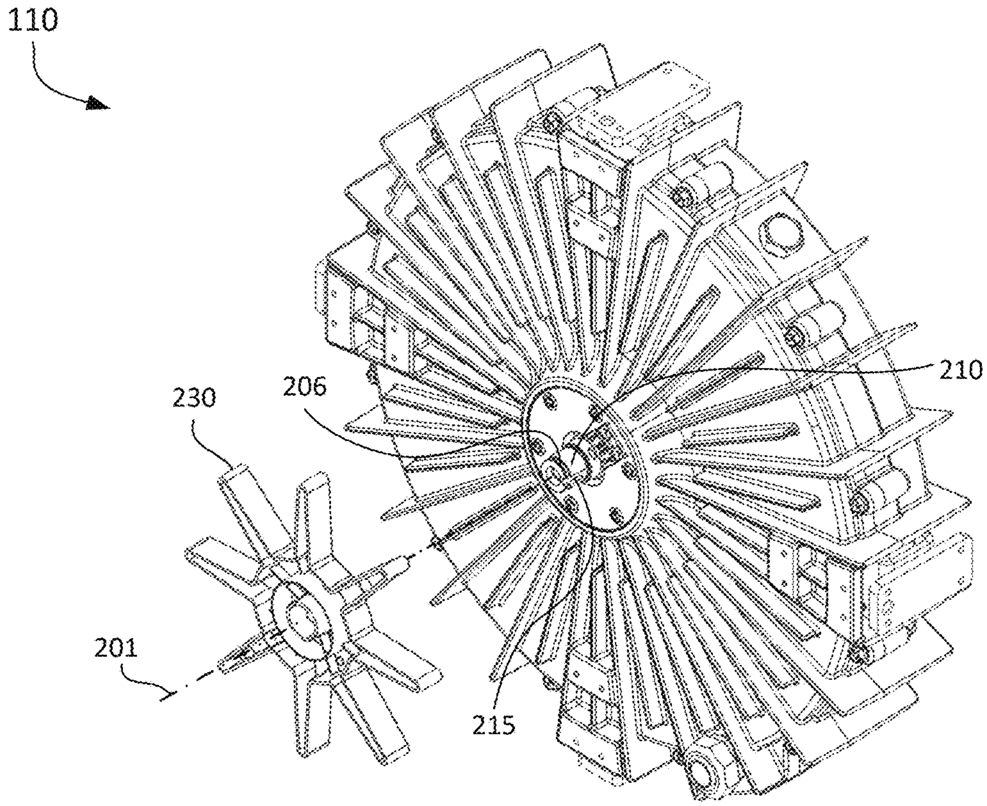
FIG. 5A is an exploded, isometric view of an embodiment of an axial field rotary energy device and impeller.
Figure 5B:
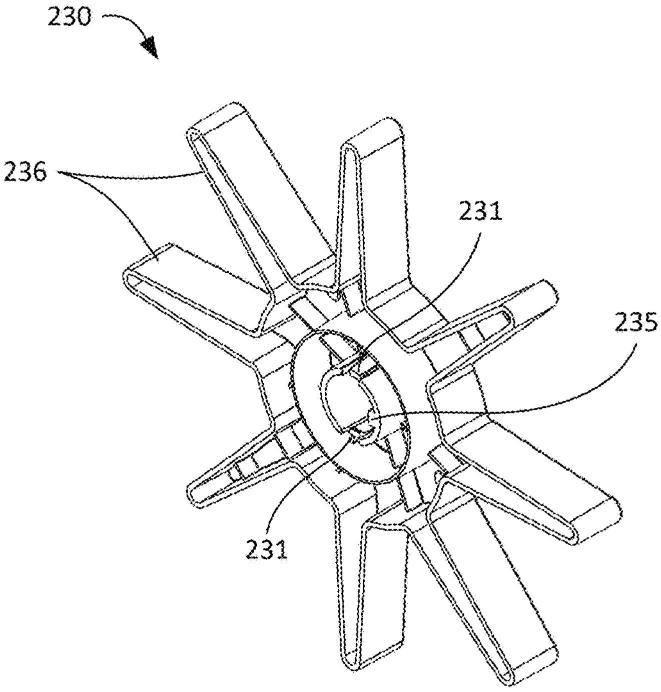
FIG. 5B is an enlarged isometric view of an embodiment of an impeller for an axial field rotary energy device.

The axial field rotary energy device 110 can have an external impeller 230 (FIGS. 5A and 5B) that can be coaxial with the axis 201 and mounted to the shaft 210 on the non-drive end, for example. The impeller 230 can provide an air flow 310 (FIG. 7A) to cool the axial field rotary energy device 110 and the VFD 120 of the VFD integrated system 100. The impeller 230 and the shaft 210 can have features to facilitate their assembly. For example, the shaft 210 can have a keyway 215 that aligns axially and engages a tab 235 on the bore of the impeller 230. The shaft 210 also can have an annular groove 206 that engages one or more retention tabs 231 on the impeller 230 when the impeller 230 is fully seated on the shaft 210. The impeller 230 can be injection molded and may comprise a structural plastic like ABS, or Nylon 12, or can be made of cast aluminum, for example. While FIGS. 5A and 5B show an embodiment with an impeller 230 on the non-drive end of the axial field rotary energy device 110, some embodiments can have impellers on both ends. The impeller 230 shown in FIGS. 5A and 5B is configured to operate in clockwise or counterclockwise rotation so it has straight radial blades 236 (FIG. 5B). Other embodiments of the impeller 230 can be configured to rotate in only one direction and can have backward curved blades or forward curved blades, for example.

Figure 6A:
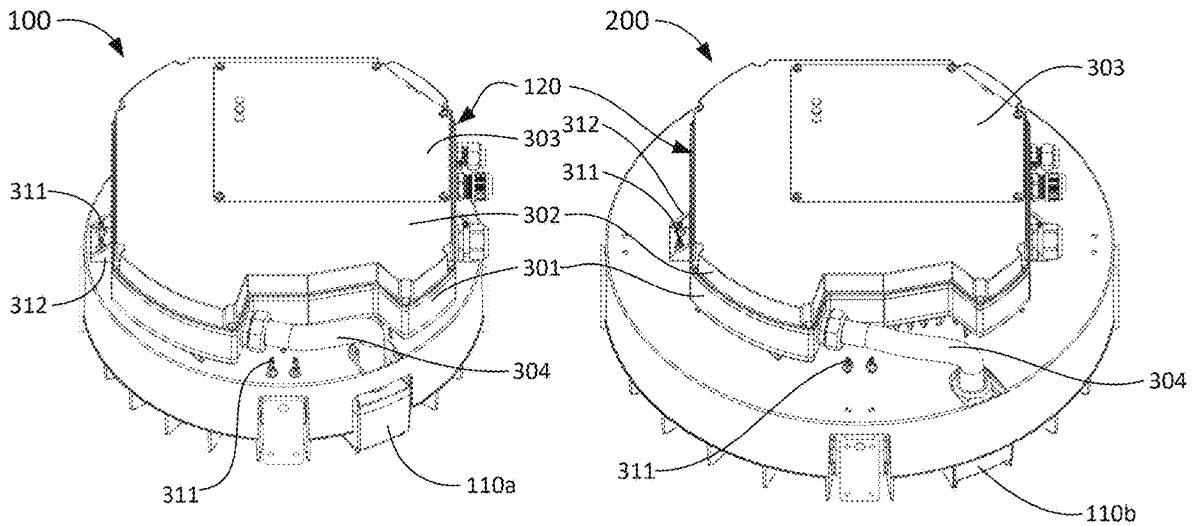
FIG. 6A is an isometric view of the VFD integrated systems shown in FIG. 3 from a different angle.
Figure 6B:
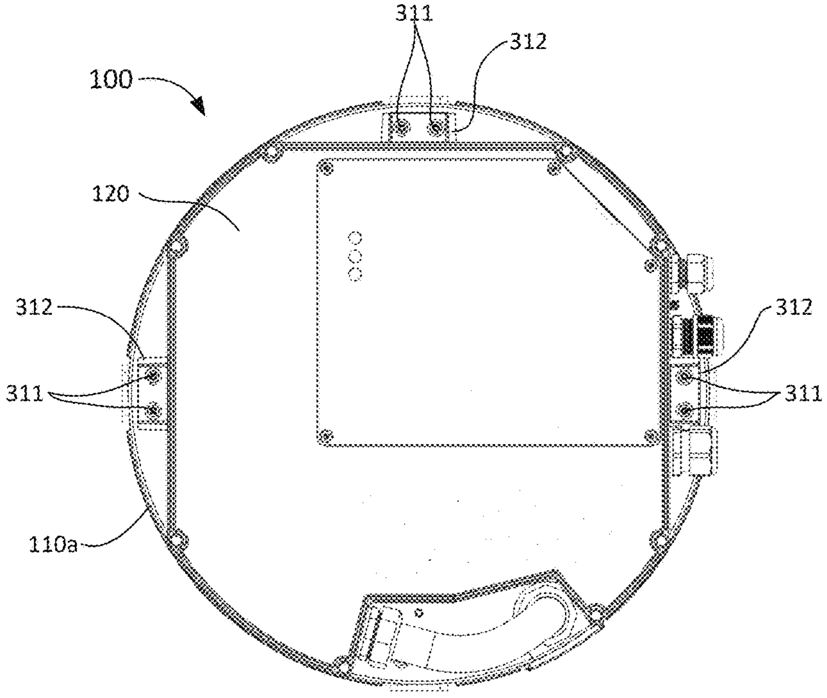
FIG. 6B is a top view of one of the VFD integrated systems shown in FIG. 6A.

FIG. 6A shows the VFD integrated systems 100, and 200 from FIG. 3 at a different angle. The VFD integrated systems 100 and 200 can have axial field rotary energy devices 110*a* and 110*b*, respectively, that are substantially different in size. The axial field rotary energy device 110*b* can have a higher power rating and be larger than device 110*a*, for example. The VFD integrated systems 100 and 200 can have VFDs 120 that have the same size or substantially the same size, so they can have the same enclosure. Each VFD 120 can have a VFD housing 301 that can be configured to receive the VFD electronics depicted in FIG. 2. The VFD 120 also can have a main cover 302 coupled to the VFD housing 301, and an access cover 303 coupled to the main cover 302. The access cover 303 can have features that facilitate its removal/installation, and to provide selective access to the VFD electronics. As shown in FIGS. 6A and 6B, the axial field rotary energy devices 110*a* and 110*b* can have captive fasteners 311 (threaded studs, for example) configured to engage mechanically with VFD brackets 312, which are coupled to the respective VFD housings 301. The spacing between captive fasteners 311 and their location on the respective axial field rotary energy device 110*a* or 110*b*, for example, is such that, independently of the size of the axial field rotary energy device, the fasteners 311 can align and engage the brackets 312 on the VFD housing 301. The fasteners 311 also can guide and align axially the VFD 120 to the respective axial field rotary energy device during assembly. In addition, the VFD housing 301 can be coupled to the respective axial field rotary energy device through a flexible conduit 304 configured to adapt to different sizes of axial field rotary energy devices 110*a*, or 110*b*, as shown in FIG. 6A.

Different versions of VFD integrated systems 100, and 200 have been shown in FIGS. 3 and 6A to illustrate the interchangeability of the VFD 120 and its enclosure relative to different versions of the respective axial field rotary energy devices 110*a*, and 110*b*. Hereinafter, the VFD integrated system will be referred to with the reference numeral 100, but it should be understood that VFD integrated system 100 can be different sizes and versions.

Figure 7A:
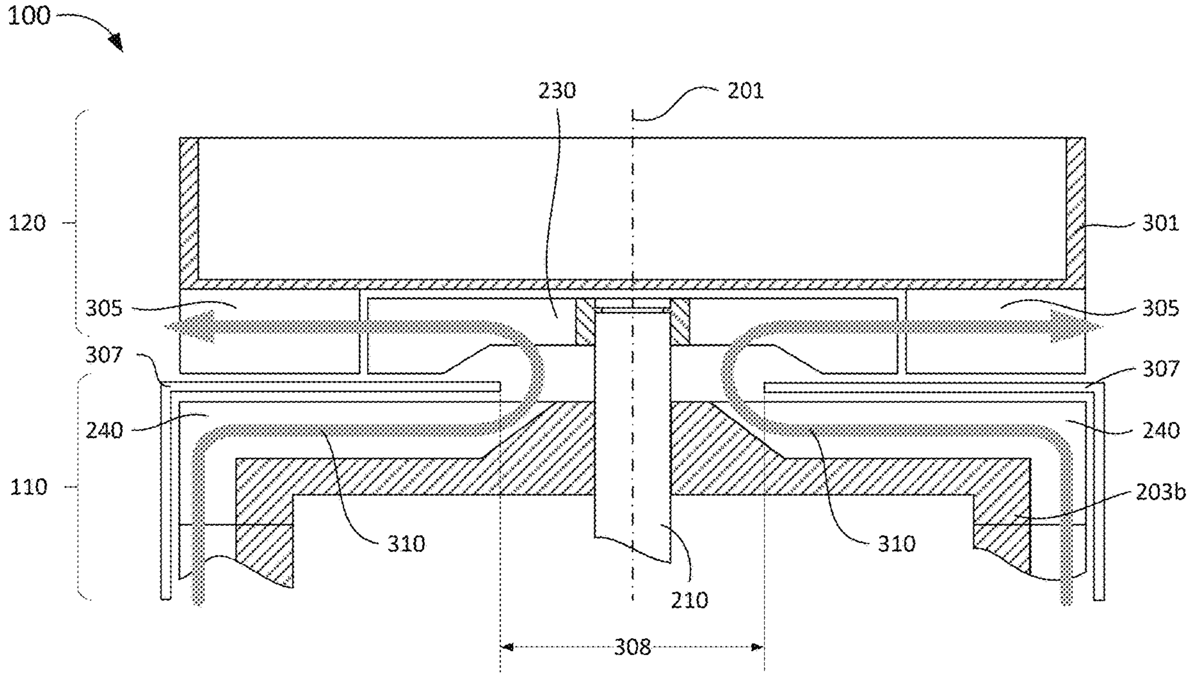
FIG. 7A is sectional schematic side view of an embodiment of a VFD integrated system showing its air flow.

FIG. 7A shows a schematic sectional view of the VFD integrated system 100 where some parts are not shown to illustrate how the airflow 310 can circulate between the axial field rotary energy device 110 and the VFD 120. The airflow 310 can be generated by the impeller 230 coupled to the shaft 210, while the shaft 210 rotates about the axis of rotation 201. The airflow 310 can be guided by a shroud 307 around fins 240 that can be part of the enclosure section 203*b* of the axial field energy rotary device 110. The airflow 310 is then directed toward a substantially circular opening 308 approximately at the center of the shroud 307 from where it can be pushed outward by the impeller 230 over fins 305 of the VFD housing 301.

Figure 7B:
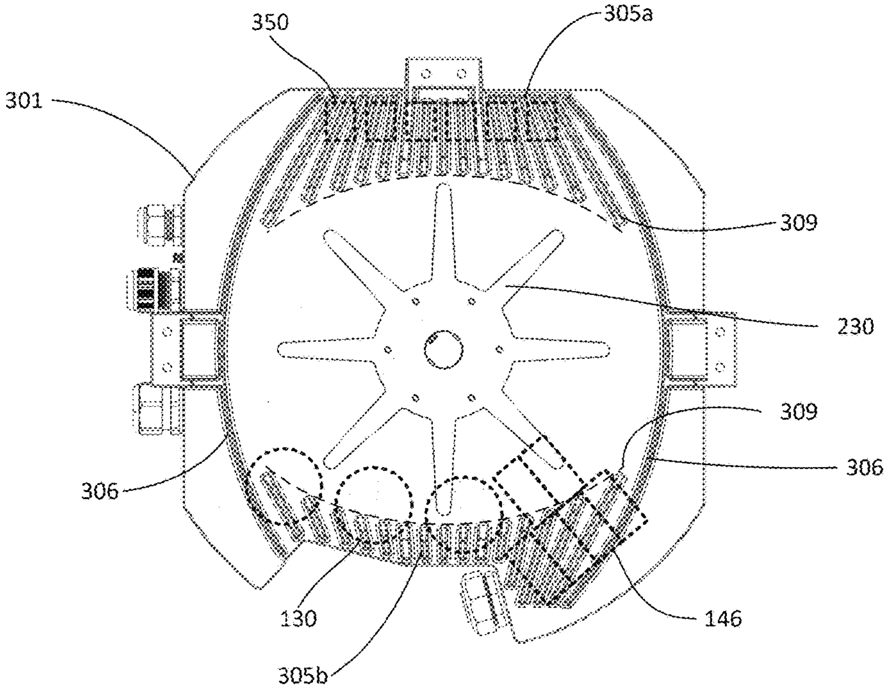
FIG. 7B is a bottom view of an embodiment of a VFD enclosure with an impeller.

As shown in FIG. 7B, the VFD housing 301 can have a plurality of fins 305*a* and 305*b* located along two opposite sides thereof in a converging pattern that can accelerate the air velocity as it moves along the fins 305*a*, 305*b* to enhance the heat removal. The airflow generated by the impeller 230 can be further directed towards the fins 305*a* and 305*b* by air guides 306, which can have a converging arrangement similar to the fins 305*a*, 305*b*. In addition to increasing the air velocity, the converging fin pattern also can increase the fin density in the areas of the VFD housing 301 that have a higher heat load to promote a more effective heat transfer to the cooling airflow. For example, fins 305*a* can be tightly packed in the area where the switching devices 350 (represented by dotted rectangles) are mounted inside the VFD housing 301. Similarly, fins 305*b* can be tightly packed in the area where inductors 130 (represented by dotted circles) and ferromagnetic cores 145 (represented by dotted rectangles) are mounted inside the VFD housing 301.

Figure 7C:
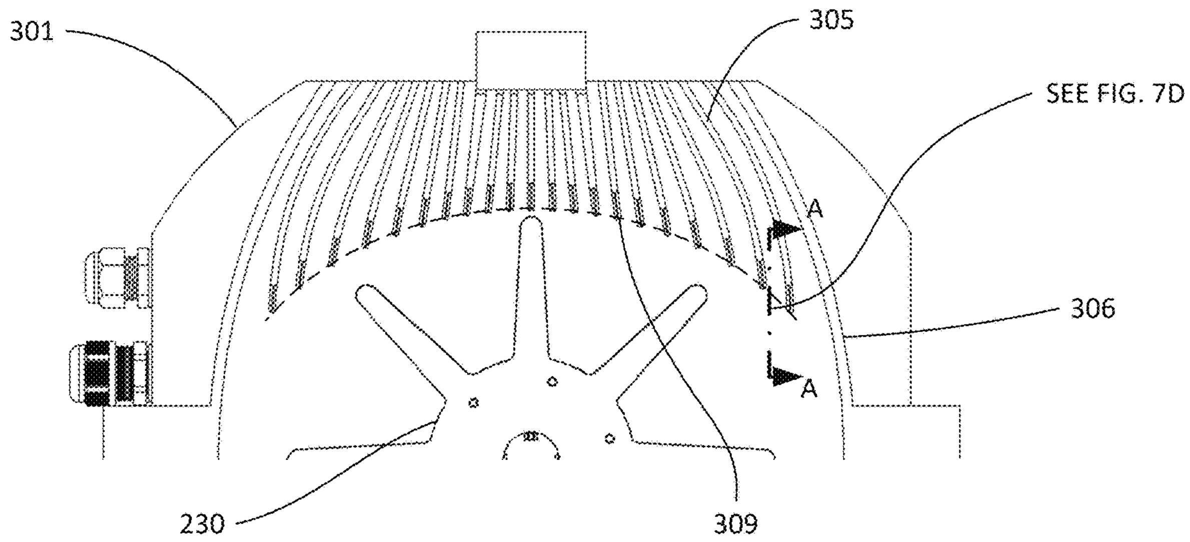
FIG. 7C is a partial bottom view of an alternate embodiment of the VFD enclosure.
Figure 7D:
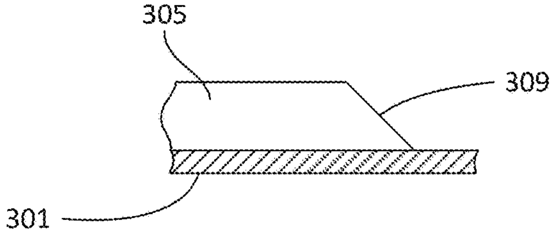
FIG. 7D is a partial sectional side view showing details of the fins in a VFD enclosure.

While FIG. 7B shows an embodiment of the VFD housing 301 with fins 305*a*, 305*b* that are substantially straight. As shown in FIG. 7C, other embodiments of the VFD housing 301 can have fins 305 with a curved profile. The fins 305 can have sloped leading edges 309 (FIG. 7D) that can reduce air drag losses to promote a more efficient air flow pattern. Furthermore, the sloped leading edges 309 collectively can form an elliptical pattern (represented by the curved dashed lines in FIGS. 7B and 7C) around the impeller 230 to enhance the capture of the air flow generated by the impeller 230 and allow for bi-directional operation of the impeller 230.

Figure 8A:
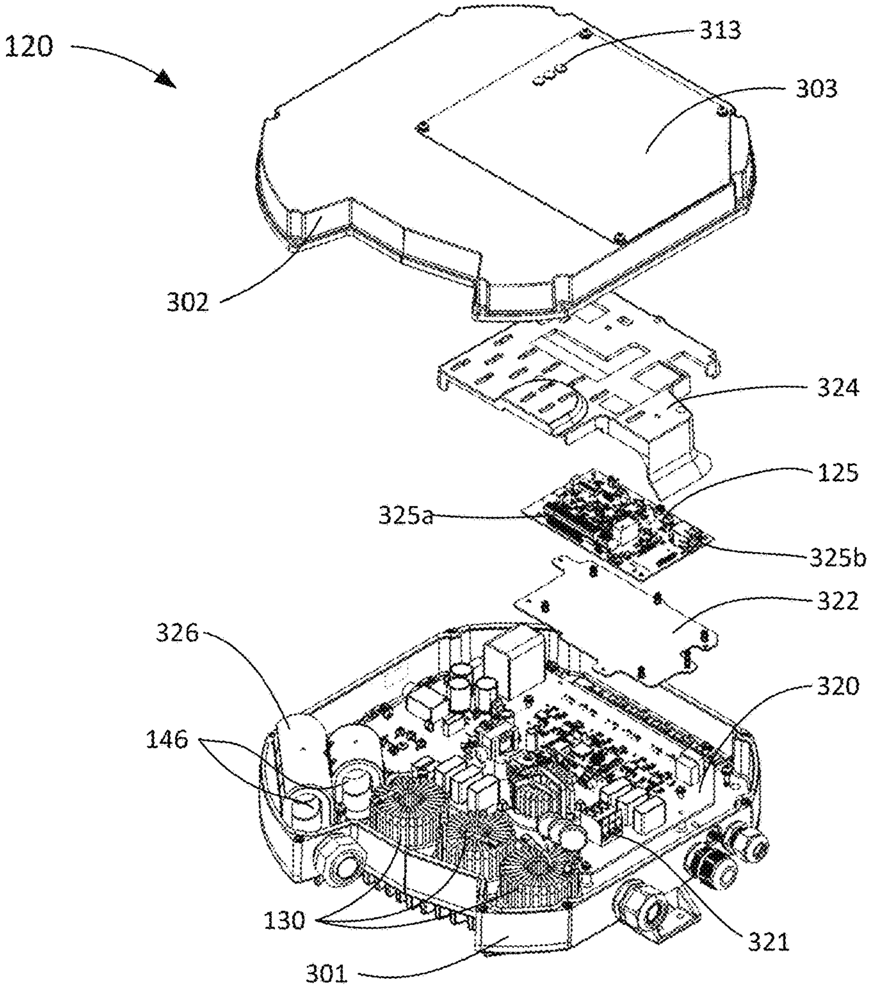
FIG. 8A is an exploded isometric view of an embodiment of a VFD showing its components.
Figure 8B:
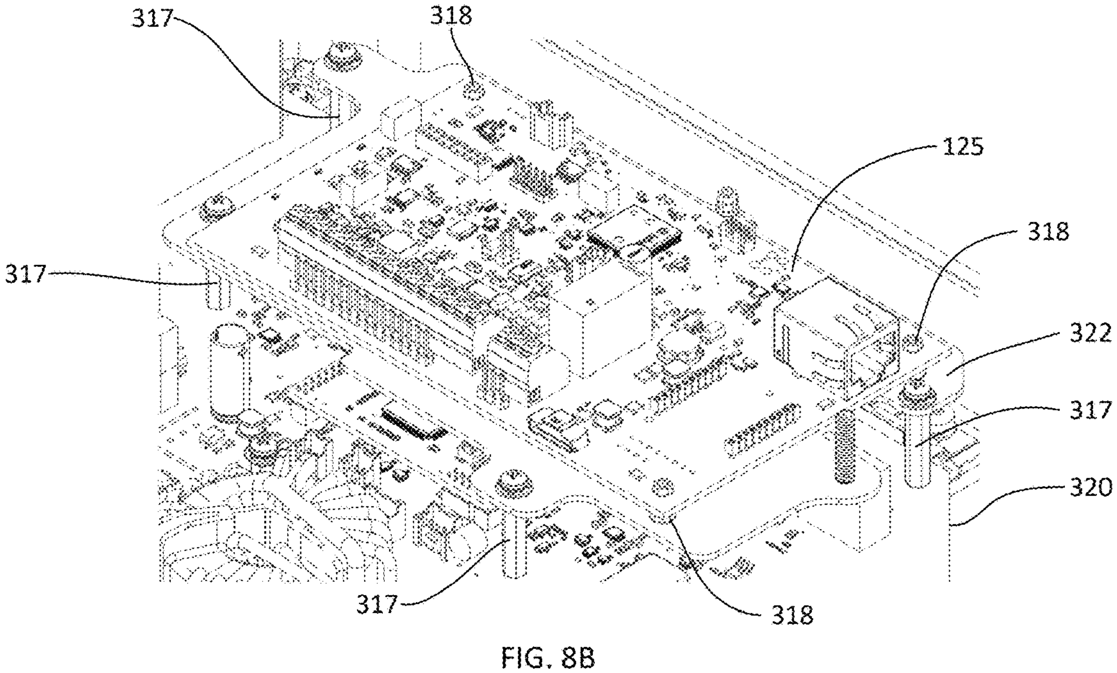
FIG. 8B is an enlarged isometric view of an embodiment of an I/O and communication module.
Figure 8C:
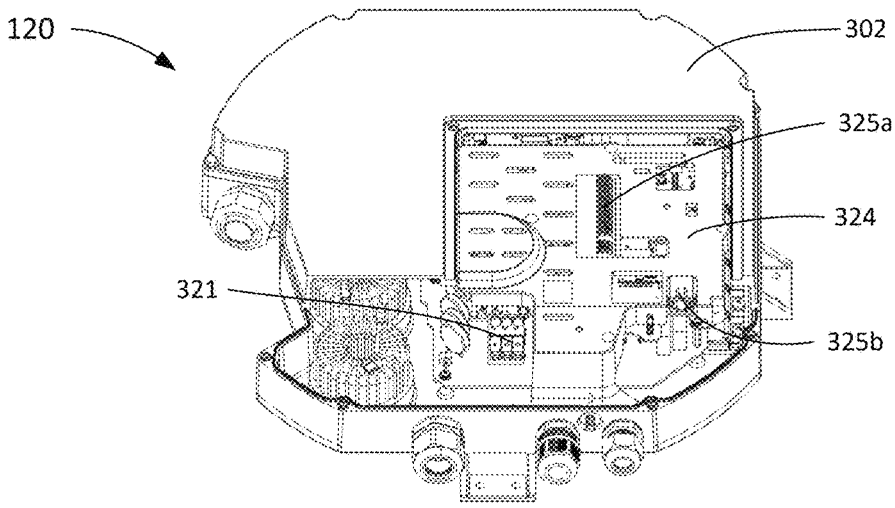
FIG. 8C is an isometric view, shown partially sectioned, of an embodiment of the VFD showing its access points.

In the embodiment shown in FIG. 8A, the VFD housing 301 is configured to receive a printed circuit board assembly (PCBA) 320 that can comprise the rectifier module 122, inverter module 121, DC bus 123, and control module 124 shown in FIG. 2, all on one single board. The VFD housing 301 also can have other components such as inductors 130 (FIG. 8A) and ferromagnetic cores 146, which can be held in place by a molded clamp 326. An I/O module 125 also can be mounted on a metal shield plate 322 that can deflect some of the electromagnetic emissions produced by the inverter module 121, so they do not interfere with the operation of the I/O module 125. The I/O module 125 can be attached to the shield plate 322 with snap-in supports 318 (FIG. 8B) that allow for quick installation and removal. The shield plate 322 can be located above the PCBA 320 and secured with standoffs 317 (FIG. 8B). The I/O module 125 also can be behind a safety barrier 324 (FIGS. 8A and 8C) that allows only selective access to power terminals 321 and communication terminals 325*a* and 325*b* when the access cover 303 is removed.

Figure 9:
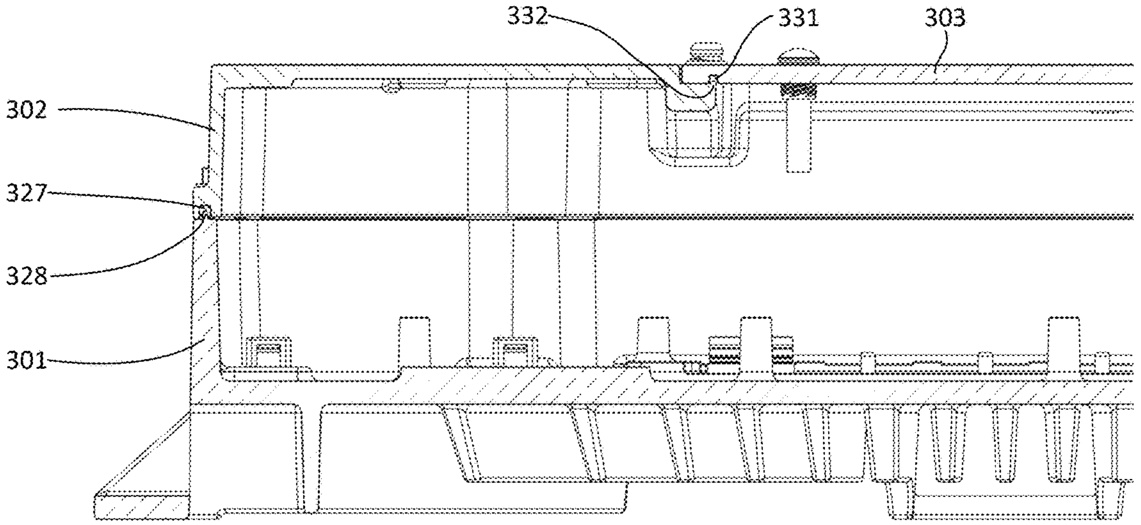
FIG. 9 is an enlarged sectional side view of an embodiment of the VFD showing its housing and cover details.

Some embodiments of the VFD 120 can be configured to meet IP54 or IP55 degree of protection as per IEC60034-5, for example. In those cases, the main cover 302 can have a channel that can receive a seal 327 (FIG. 9). The seal 327 can engage a raised edge 328 in the VFD housing 301. When the main cover 302 is fastened to the VFD housing 301, the raised edge 328 can compress the seal 327 to prevent water or dust from entering the VFD 120. The seal 327 can be an O-ring or an extruded gasket, for example. The VFD housing 301 can comprise a thermally conductive material such as cast aluminum, for example. In some embodiments, where shielding against electromagnetic interference (EMI) is desired, the main cover 302 can be made of a conductive material such as cast aluminum or molded plastic with a conductive metallic coating. In those cases, the seal 327 can be conductive.

Figure 10:
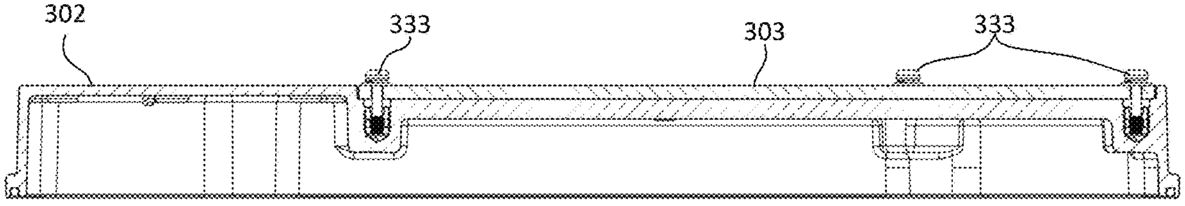
FIG. 10 is a sectional side view of an embodiment of the VFD cover.

Similar to the interface between the VFD housing 301 and main cover 302, the access cover 303 (FIG. 9) can have a channel configured to receive a seal 331 that can engage a raised edge 332 on the main cover 302. When the access cover 303 is fastened to the main cover 302, the raised edge 332 can compress the seal 331 to prevent water or dust from entering the VFD 120. The seal 331 can be an O-ring or an extruded gasket, for example. In embodiments where shielding against electromagnetic interference (EMI) is desired, the main cover 302 and access cover 303 can be made of a conductive material such as cast aluminum or molded plastic with a metallic conductive coating. In those cases, the seal 331 can be conductive. The access cover 303 can be configured to be easily removed from and reinstalled on the main cover 302 with captive fasteners 333 (FIG. 10) that can stay permanently attached to the cover 303.

Figure 11A:
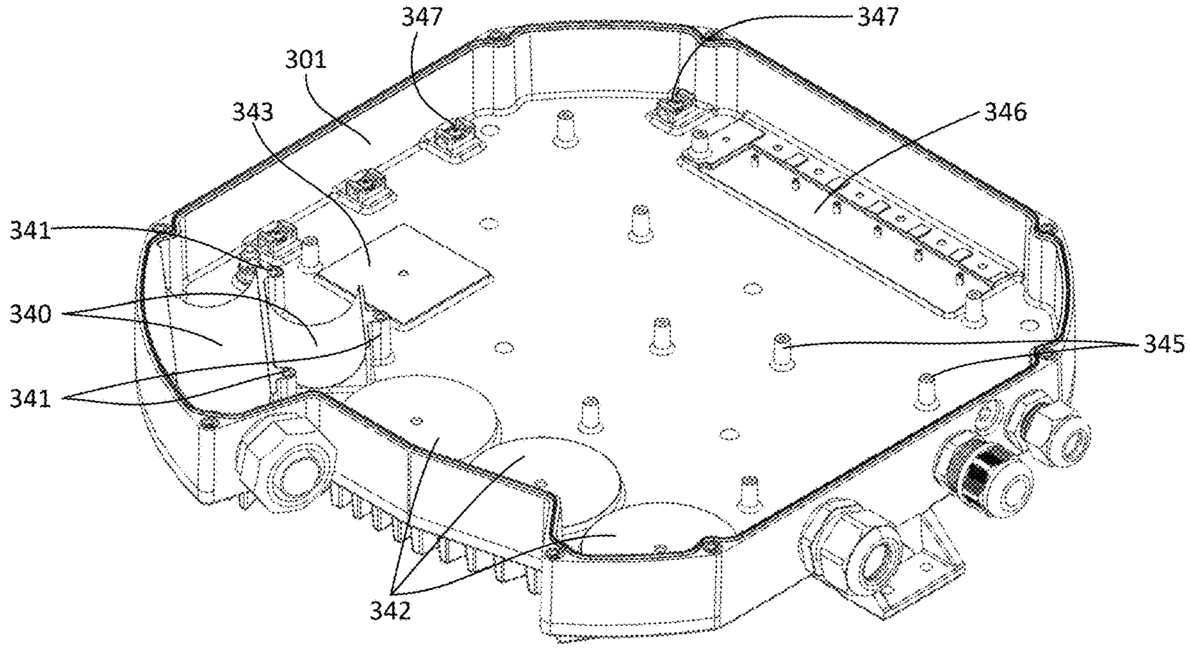
FIG. 11A is an isometric view of an embodiment of the VFD housing showing internal details.
Figure 11B:
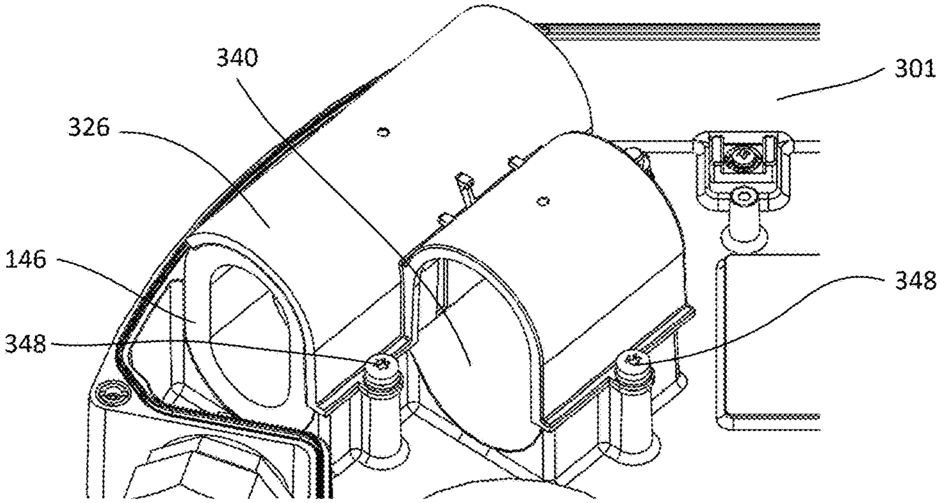
FIG. 11B is an enlarged isometric view of a portion of the VFD housing showing ferromagnetic core holding details.
Figure 11C:
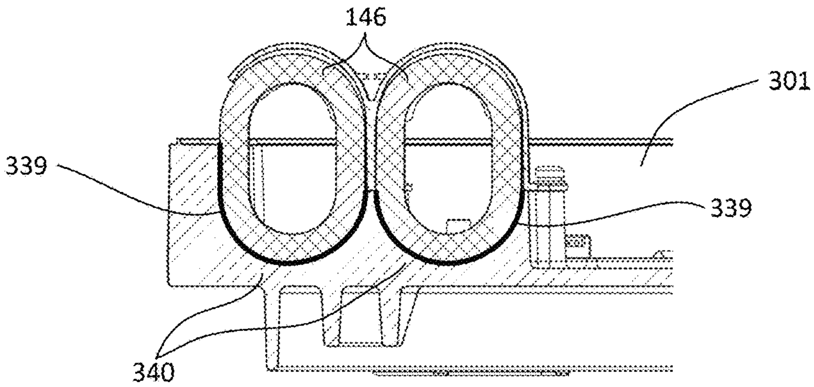
FIG. 11C is a sectional side view of a portion of an embodiment of ferromagnetic core mounting details.

The VFD housing 301 can have features to facilitate the assembly of the VFD components and to remove heat from those components during operation of the VFD integrated system 100. As shown in FIG. 11A, the VFD housing 301 can have concave cradles 340 configured to receive ferromagnetic cores 146 (FIG. 11B). The ferromagnetic cores 146 can be held in place by a core clamp 326 that is fastened to bosses 341 with screws 348 (FIG. 11B), for example. As shown in FIG. 11C, the concave cradles 340 can have contours 339 that closely match the outer surface of the ferromagnetic cores 146 to enhance surface contact therebetween, reduce thermal resistance, and facilitate heat removal. FIG. 11B shows an embodiment where not all concave cradles 340 are populated with ferromagnetic cores 146. Other embodiments of the VFD 120 can have both concave cradles 340 populated with ferromagnetic cores 146. Some embodiments can have the core clamp 326 made of a non-conductive material such as ABS or nylon 12, for example. Other embodiments can have the core clamp 326 made of a conductive material such as die-cast aluminum or stamped steel, for example.

Back to FIG. 11A, the VFD housing 301 can have pads 342 configured to receive inductors 130 (FIG. 8A). Another pad 343 can be configured to receive and function as a heatsink for a rectifier module that can be part of the PCBA 320 (FIG. 8A). In addition, the VFD housing 301 can have a plurality of standoffs 345 integral to the VFD housing, and configured to support the PCBA 320. The VFD housing 301 also can have pads with wire loops 347 configured to receive tie wraps, for example, to secure electrical cables that connect the components of the VFD. Furthermore, the VFD housing 301 can have a pad 346 configured to receive and function as a heatsink for the active switching devices (IGBTs or MOSFETs for example) of the PCBA 320.

Figure 11D:
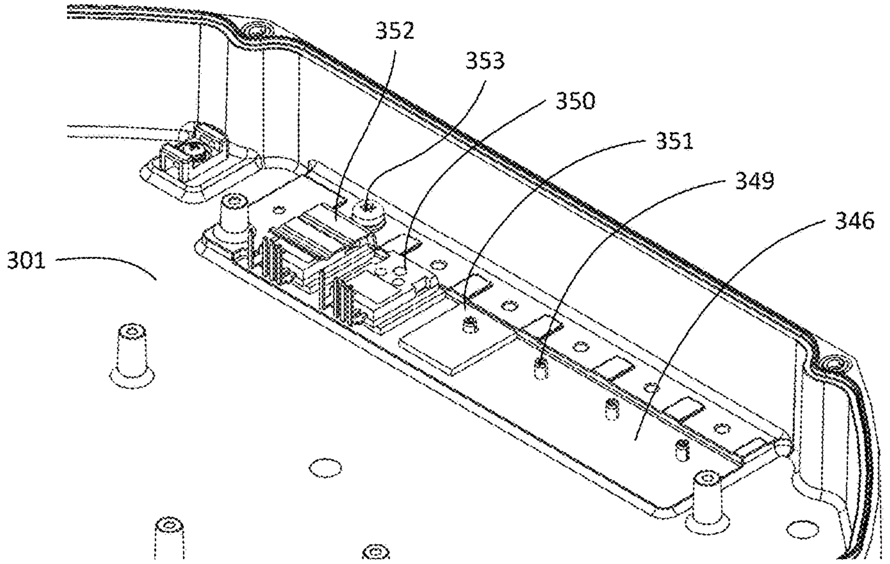
FIG. 11D is an enlarged isometric view of a portion of an embodiment of the VFD housing showing switching device mounting details.

FIG. 11D shows details of how the switching devices 350 can be mounted on the pad 346 of the VFD housing 301. The pad 346 can have alignment pins 349 configured to receive and align thermal interface pads 351 and respective switching devices 350. The switching device 350 can be held in place by a spring clip 352 attached to the VFD housing 301 by the fastener 353. The spring clips 352 are configured to provide a uniform clamping force to the respective switching device 350 independently of the torque applied to fasteners 353. This arrangement is advantageous because it prevents the application of excessive force that could damage the switching device 350. In addition, as the thermal resistance between the switching device 350, its respective thermal interface pad 351, and the pad 346 can be affected by the force applied by the spring clip 352, the uniform clamping force can result in uniform thermal resistance and, therefore, uniform temperature of the switching devices 350 during operation. While the pad 346 in FIG. 11D is configured to receive six switching devices, other embodiments of the VFD housing 301 can have pads configured to receive a different number of switching devices.

Figure 12:
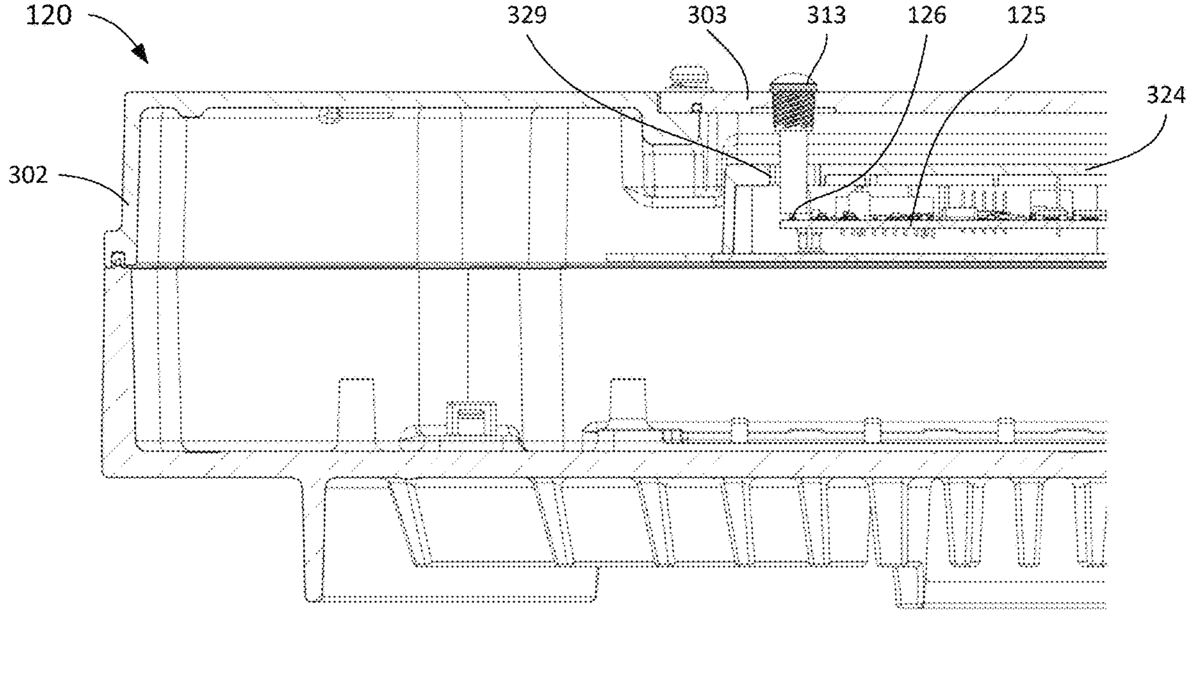
FIG. 12 is an enlarged sectional side view of a portion of an embodiment of VFD covers with light pipes.

In some embodiments of the VFD 120, like the one shown in FIG. 12, the I/O module 125 can have one or more LEDs 126 that can indicate the status of the VFD. For example, a green LED can indicate normal operation, or red LED can indicate power on. To make the status of the LEDs 126 visible to users, the access cover 303 (FIGS. 8A and 12) can have light pipes 313 mounted to it. When the access cover 303 is fastened to the VFD main cover 302 (FIG. 12), the light pipes 313 can extend through openings 329 in the safety barriers 324, and be aligned with the LEDs 126 making their status visible externally without the need to remove the access cover 303 or the safety barrier 324. FIG. 8A shows an embodiment of the VFD 120 with three light pipes 313 attached to the access cover 303. Other versions can have a different number of light pipes.

Still other embodiments can include one or more of the following items.

A system, comprising:

an axial field rotary energy device having:

an axis of rotation;

a rotor coaxial with the axis and having a shaft, bearings, rotor disks that are coaxial, permanent magnets on each rotor disk, and the permanent magnets on each rotor disk face toward each other;

a printed circuit board (PCB) stator located axially between the rotor disks to define an air gap on each side of the PCB stator between the PCB stator and each of the rotor disks;

an enclosure having two enclosure sections with at least one of the enclosure sections having an inspection port oriented radially, relative to the axis, and aligned with the PCB stator and the air gaps between the PCB stator and the rotor disks, such that the inspection port provides a direct line of sight to the air gaps;

bearing caps and bearings mounted to the rotor;

an annular shim located between a respective bearing cap and a respective bearing, wherein an axial position of the rotor is adjusted and widths of the air gaps are changed by adding or removing the annular shims; and the system further comprises:

a variable frequency drive (VFD) assembly coupled to the axial field rotary energy device and comprising:

a flexible conduit that extends between the VFD housing and the axial field rotary energy device, wherein the flexible conduit is configured to adapt to different sizes of axial field rotary energy devices.

The system wherein at least one of the bearing caps comprises a grounding brush.

The system wherein the bearings have different sizes.

The system further comprising an impeller coupled to the shaft of the rotor, wherein the impeller has retention tabs that engage with a groove in the shaft to retain the impeller on the shaft.

The system wherein at least one of the bearing caps comprises a grounding brush and the bearings have different sizes.

The system further comprising an impeller coupled to the shaft of the rotor, wherein the impeller has retention tabs that engage with a groove in the shaft to retain the impeller on the shaft, and at least one of the bearing caps comprises a grounding brush.

The system wherein the bearings have different sizes.

The system further comprising an impeller coupled to the shaft of the rotor, wherein the impeller has retention tabs that engage with a groove in the shaft to retain the impeller on the shaft, and the bearings have different sizes.

The system further comprising a metal shim located between the PCB stator and at least one of the enclosure sections of the axial field rotary energy device, wherein the metal shims axially couple the PCB stator to the enclosure sections to transfer heat from the PCB stator to the enclosure sections.

The system further comprising metal shims located between the PCB stator and at least one of the enclosure sections of the axial field rotary energy device, wherein the metal shims axially couple the PCB stator to the enclosure sections to transfer heat from the PCB stator to the enclosure sections.

The system further comprising metal shims located between the PCB stator and at least one of the enclosure sections of the axial field rotary energy device, wherein the metal shims axially couple the PCB stator to the enclosure sections to transfer heat from the PCB stator to the enclosure sections.

The system further comprising metal shims located between the PCB stator and at least one of the enclosure sections of the axial field rotary energy device, wherein the metal shims axially couple the PCB stator to the enclosure sections to transfer heat from the PCB stator to the enclosure sections.

The system further comprising metal shims located between the PCB stator and at least one of the enclosure sections of the axial field rotary energy device, wherein the metal shims axially couple the PCB stator to the enclosure sections to transfer heat from the PCB stator to the enclosure sections.

The system further comprising metal shims located between the PCB stator and at least one of the enclosure sections of the axial field rotary energy device, wherein the metal shims axially couple the PCB stator to the enclosure sections to transfer heat from the PCB stator to the enclosure sections.

The system wherein the metal shims comprise copper foam.

The system further comprising metal shims located between the PCB stator and at least one of the enclosure sections of the axial field rotary energy device, wherein the metal shims axially couple the PCB stator to the enclosure sections to transfer heat from the PCB stator to the enclosure sections.

The system wherein the metal shims comprise copper foam.

The system further comprising metal shims located between the PCB stator and at least one of the enclosure sections of the axial field rotary energy device, wherein the metal shims axially couple the PCB stator to the enclosure sections to transfer heat from the PCB stator to the enclosure sections.

The system wherein the metal shims comprise copper foam.

The system wherein the axial field rotary energy device and the VFD housing achieve a degree of protection IP54 according to IEC60034-5 or higher.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" is employed to describe elements and components described herein. This is done merely for convenience and to give a general sense of the scope of the invention. This description should be read to include one or at least one and the singular also includes the plural unless it states otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the specification, skilled artisans will appreciate that certain features which are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

What is claimed is:

1. A system, comprising:

an axial field rotary energy device having:

an axis of rotation;

a rotor coaxial with the axis and having a shaft, rotor disks and permanent magnets on each rotor disk;

a printed circuit board (PCB) stator located axially between the rotor disks to define an air gap on each side of the PCB stator between the PCB stator and each of the rotor disks;

an enclosure having an inspection port oriented radially, relative to the axis, and aligned with the PCB stator and the air gaps, such that the inspection port provides a direct line of sight to the air gaps; and the system further comprises:

a variable frequency drive (VFD) having a VFD housing coupled to the enclosure.

2. The system of claim 1, wherein the rotor further comprises a bearing and a bearing cap, and at least one of the bearing caps comprises a grounding brush.

3. The system of claim 2, wherein an axial position of the rotor is configured to be adjusted by adding or removing an annular shim between the bearing and the bearing cap.

4. The system of claim 1, further comprising an impeller coupled to the shaft of the rotor, wherein the impeller has retention tabs that engage a groove in the shaft to retain the impeller on the shaft.

5. The system of claim 4, wherein the rotor further comprises bearings and bearing caps, and at least one of the bearing caps comprises a grounding brush.

6. The system of claim 5, wherein an axial position of the rotor is configured to be adjusted by adding or removing an annular shim between one of the bearings and a respective bearing cap.

7. The system of claim 1 further comprising an impeller coupled to the shaft of the rotor, wherein the impeller has retention tabs that engage a groove in the shaft to retain the impeller on the shaft, and an axial position of the rotor is configured to be adjusted by adding or removing an annular shim between a bearing and a bearing cap of the rotor.

8. The system of claim 1, further comprising a metal shim located between the PCB stator and the enclosure, wherein the metal shim axially couples the PCB stator to the enclosure to transfer heat from the PCB stator to the enclosure.

9. The system of claim 8, wherein the metal shim comprises copper foam.

10. The system of claim 1, wherein the axial field rotary energy device and the VFD housing achieve a degree of protection IP54 according to IEC60034-5 or higher.

11. The system of claim 1, further comprising a flexible conduit that extends between the VFD housing and the enclosure, wherein the flexible conduit is configured to adapt to different sizes of axial field rotary energy devices.

12. A system, comprising:

an axial field rotary energy device having:

an axis of rotation;

a rotor coaxial with the axis and having a shaft, a bearing, a bearing cap and rotor disks, and permanent magnets on each rotor disk, wherein an axial position of the rotor is configured to be adjusted by adding or removing an annular shim between the bearing and the bearing cap;

a printed circuit board (PCB) stator located axially between the rotor disks to define an air gap on each side of the PCB stator between the PCB stator and each of the rotor disks;

an enclosure; and the system further comprises:

a variable frequency drive (VFD) having a VFD housing coupled to the enclosure.

13. The system of claim 12, wherein at least one of the bearing caps comprises a grounding brush.

14. The system of claim 12, further comprising an impeller coupled to the shaft of the rotor, wherein the impeller has retention tabs that engage a groove in the shaft to retain the impeller on the shaft.

15. The system of claim 14, wherein at least one of the bearing caps comprises a grounding brush.

16. The system of claim 12, further comprising a metal shim located between the PCB stator and the enclosure, wherein the metal shim axially couples the PCB stator to the enclosure to transfer heat from the PCB stator to the enclosure.

17. The system of claim 16, wherein the metal shim comprises copper foam.

18. The system of claim 12, wherein the axial field rotary energy device and the VFD housing achieve a degree of protection IP54 according to IEC60034-5 or higher.

19. The system of claim 12, further comprising a flexible conduit that extends between the VFD housing and the enclosure, wherein the flexible conduit is configured to adapt to different sizes of axial field rotary energy devices.

20. A system, comprising:

an axial field rotary energy device having:

an axis of rotation;

a rotor coaxial with the axis and having a shaft, rotor disks and permanent magnets on each rotor disk;

a printed circuit board (PCB) stator located axially between the rotor disks to define an air gap on each side of the PCB stator between the PCB stator and each of the rotor disks;

an enclosure having an inspection port that provides a direct line of sight to the air gaps; and the system further comprises:

a variable frequency drive (VFD) coupled to the axial field rotary energy device.

* * * * *